No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 1.

WITNESSES:
J. B. McGirr.
W. W. Ketchum

INVENTOR
William N. Parkes.

No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 3.

No. 875,024.

PATENTED DEC. 31, 1907.

W. N. PARKES.
AUTOMATIC EMBROIDERY OR ORNAMENTAL STITCH SEWING MACHINE.
APPLICATION FILED NOV. 27, 1905.

10 SHEETS—SHEET 5.

WITNESSES:
J. B. McGivr.
W. W. Ketchum

INVENTOR
William N. Parkes

No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 6.
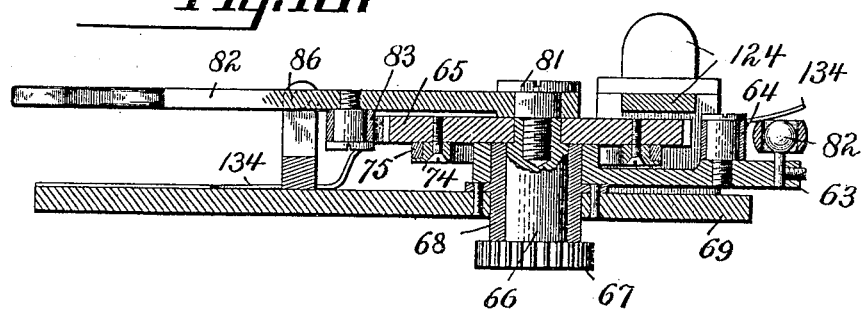
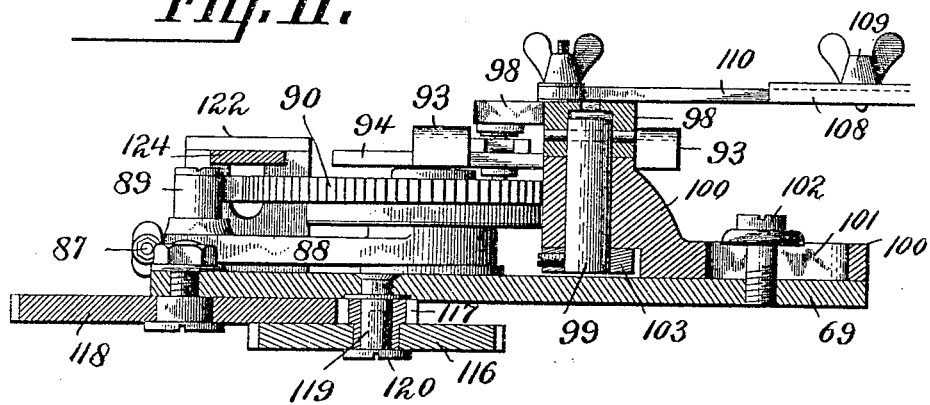
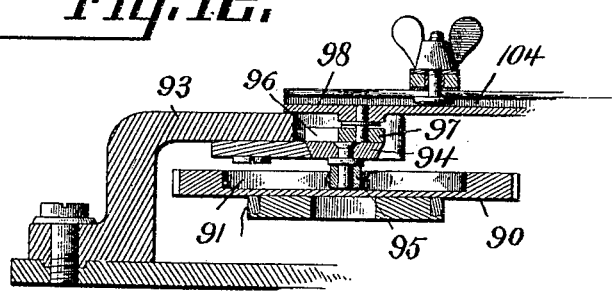

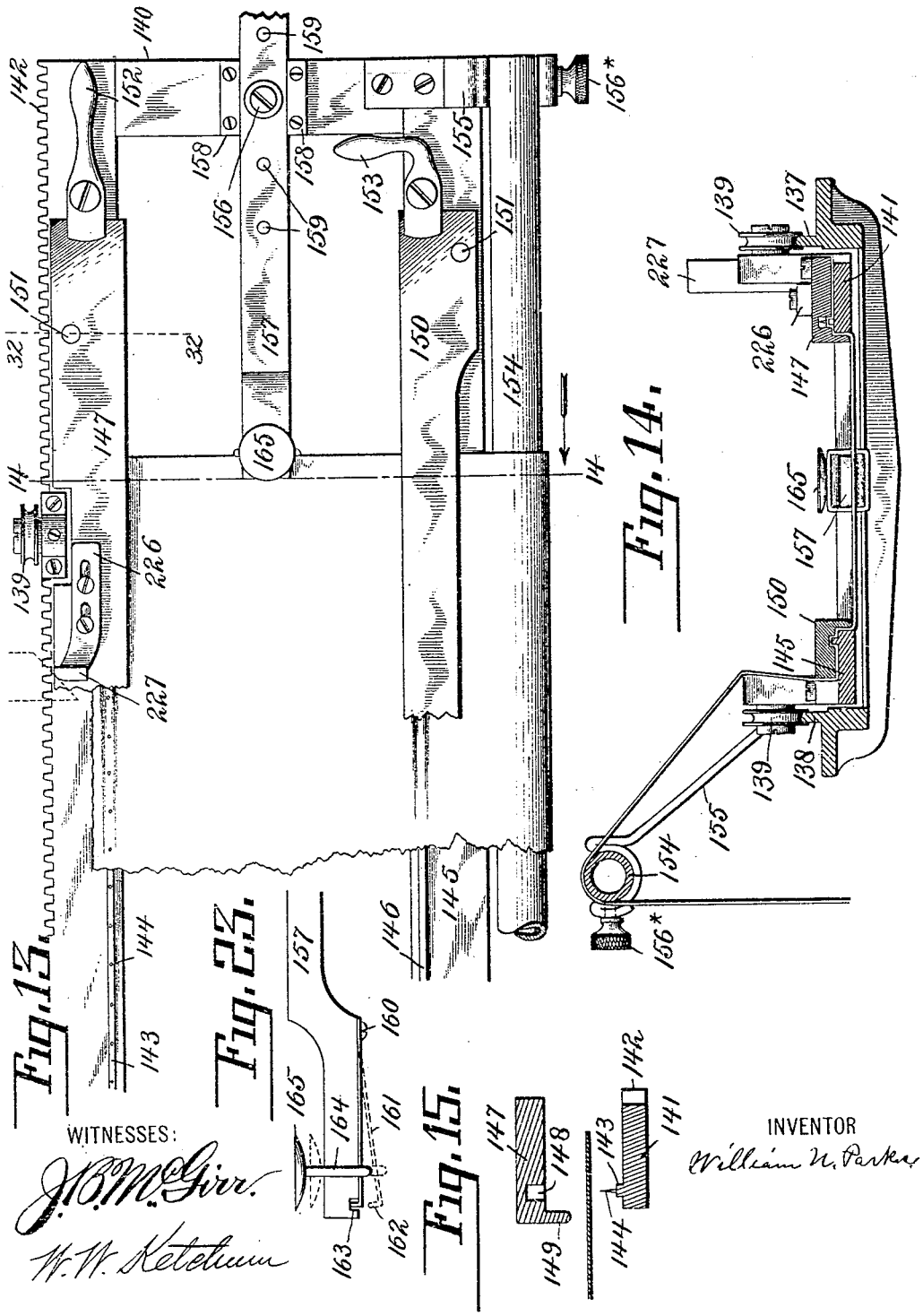

No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 8.
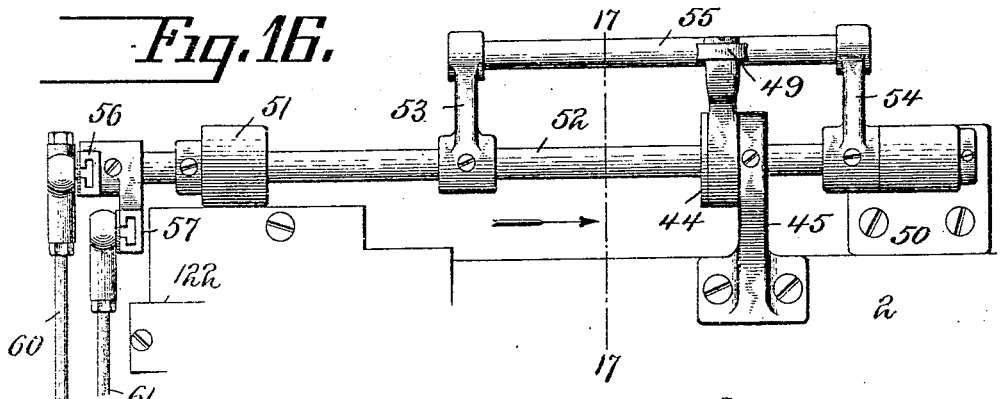
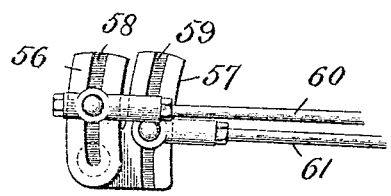
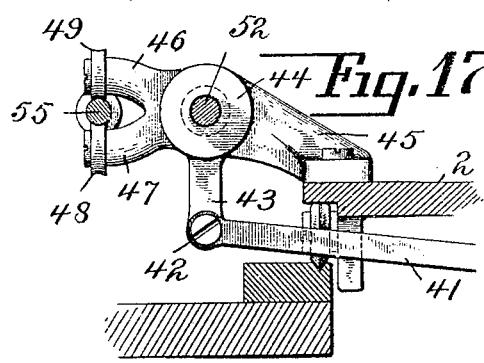
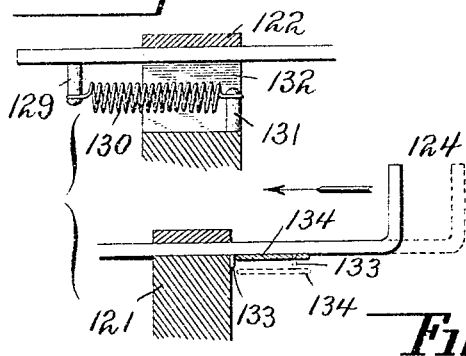
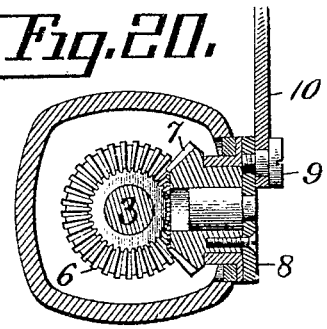
WITNESSES:
J.B.McGirr.
W.W.Ketchum
INVENTOR
William N. Parkes.

No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 2.

WITNESSES: Fig. 28. INVENTOR
J. B. McGiver. William N. Parkes.
W. W. Ketcham.

No. 875,624. PATENTED DEC. 31, 1907.
W. N. PARKES.
AUTOMATIC EMBROIDERY OR ORNAMENTAL STITCH SEWING MACHINE.
APPLICATION FILED NOV. 27, 1905.
10 SHEETS—SHEET 10.
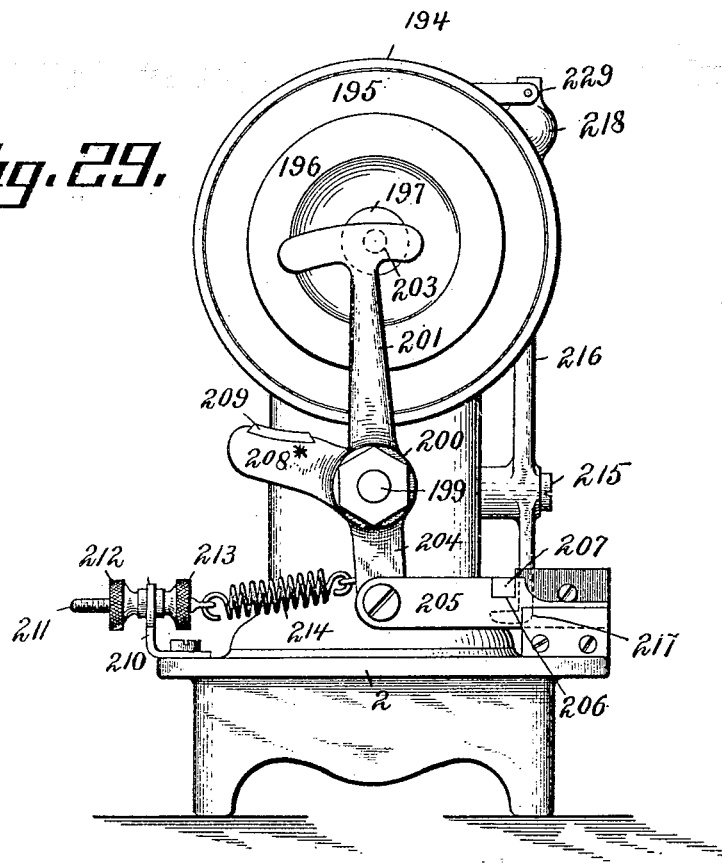
Fig. 29.
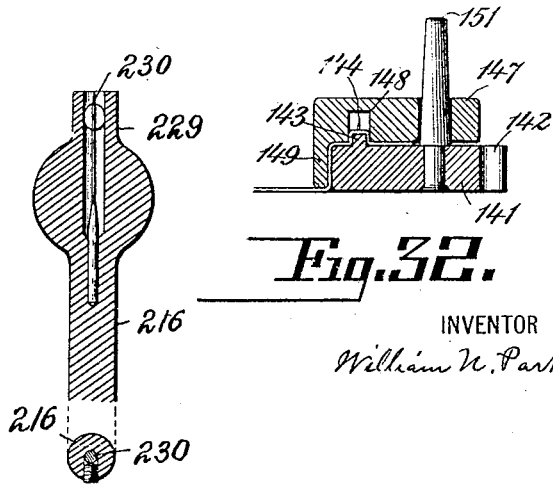
Fig. 30.
Fig. 32.
WITNESSES:
J. B. McGivr.
W. W. Ketchum
INVENTOR
William N. Parkes

UNITED STATES PATENT OFFICE.

WILLIAM N. PARKES, OF BROOKLYN, NEW YORK.

AUTOMATIC EMBROIDERY OR ORNAMENTAL STITCH SEWING-MACHINE.

No. 875,624.     Specification of Letters Patent.     Patented Dec. 31, 1907.

Application filed November 27, 1905. Serial No. 289,324.

*To all whom it may concern:*

Be it known that I, WILLIAM N. PARKES, a citizen of the United States, residing in Brooklyn, county of Kings, and State of New York, have invented a new and useful Improvement in Automatic Embroidery or Ornamental Stitch Sewing-Machines, of which the following is a description.

This invention relates to sewing machines, and particularly to the class known as embroidery or ornamental stitch machines.

It has for its object, various improvements in these machines, and it consists of these improvements as disclosed in the specification, and specifically set forth in the claims.

Figure 1:
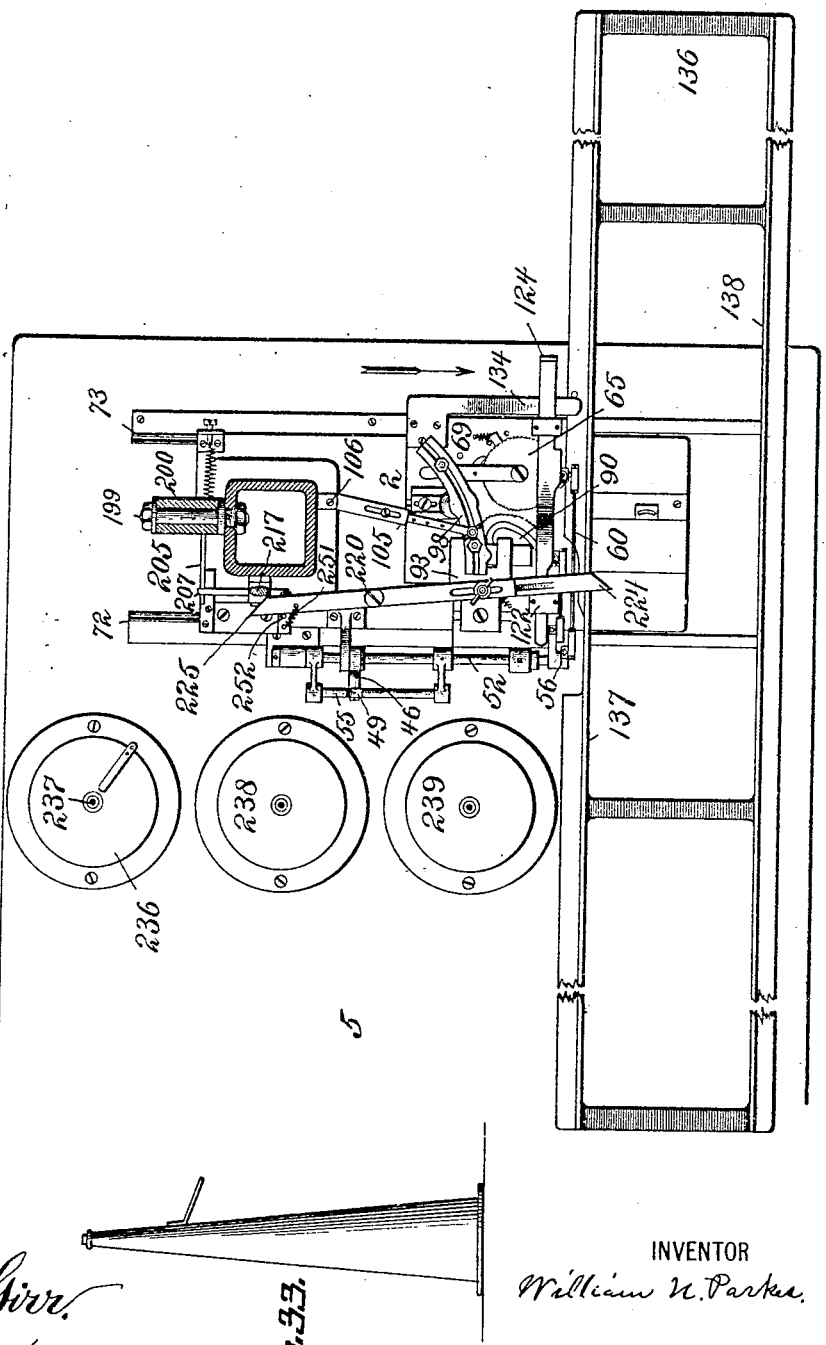
Figure 2:
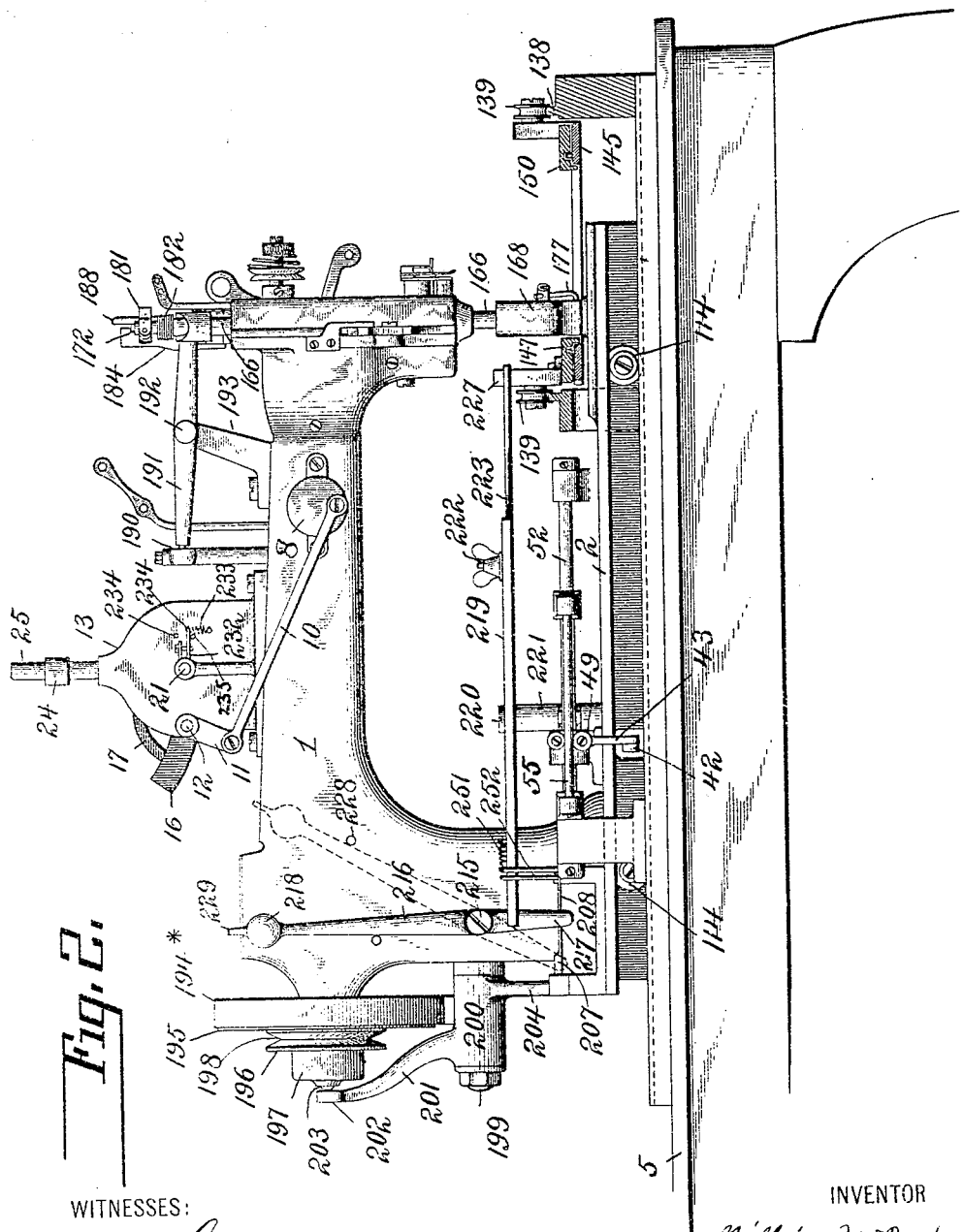
Figure 3:
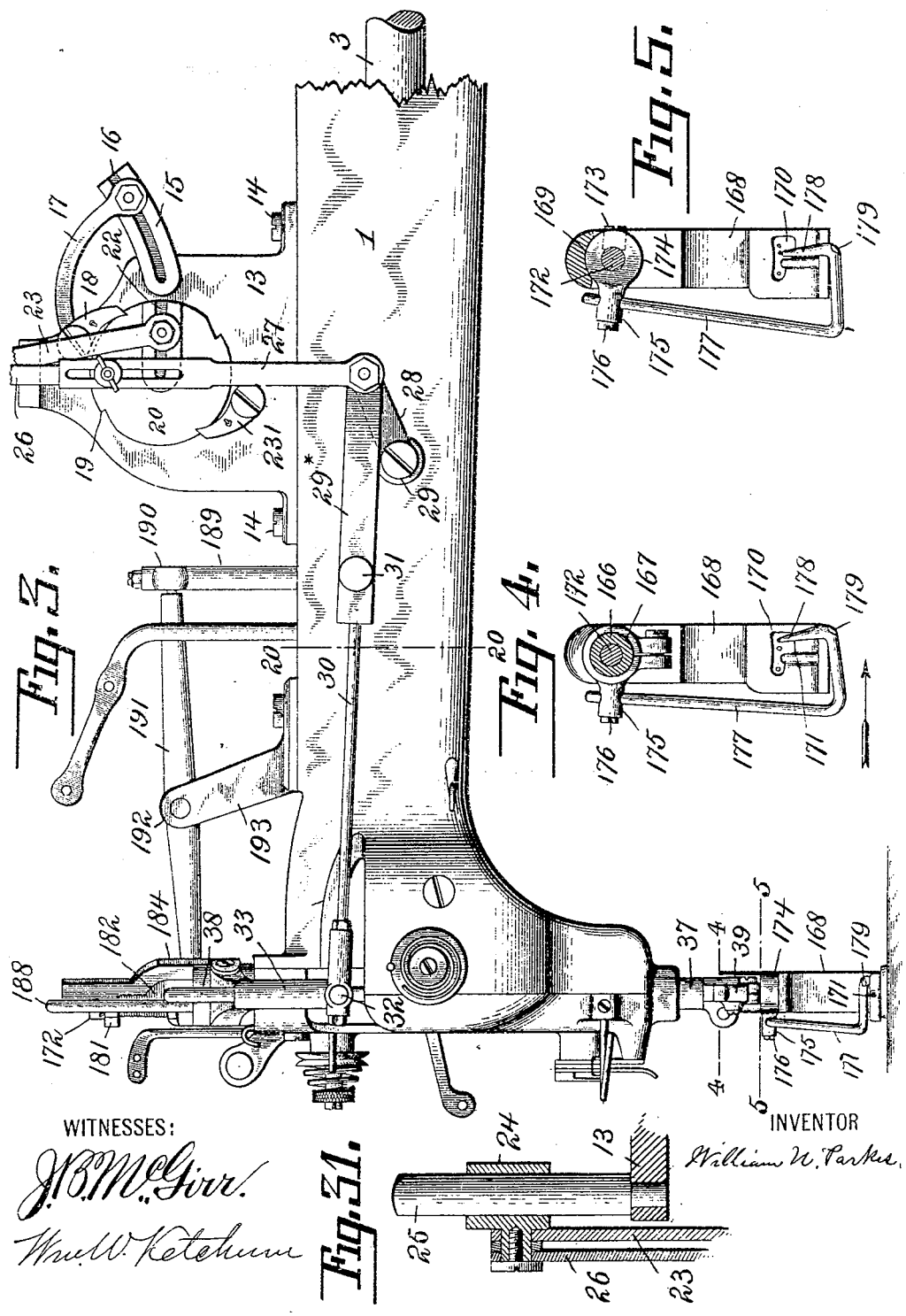
Figure 4:
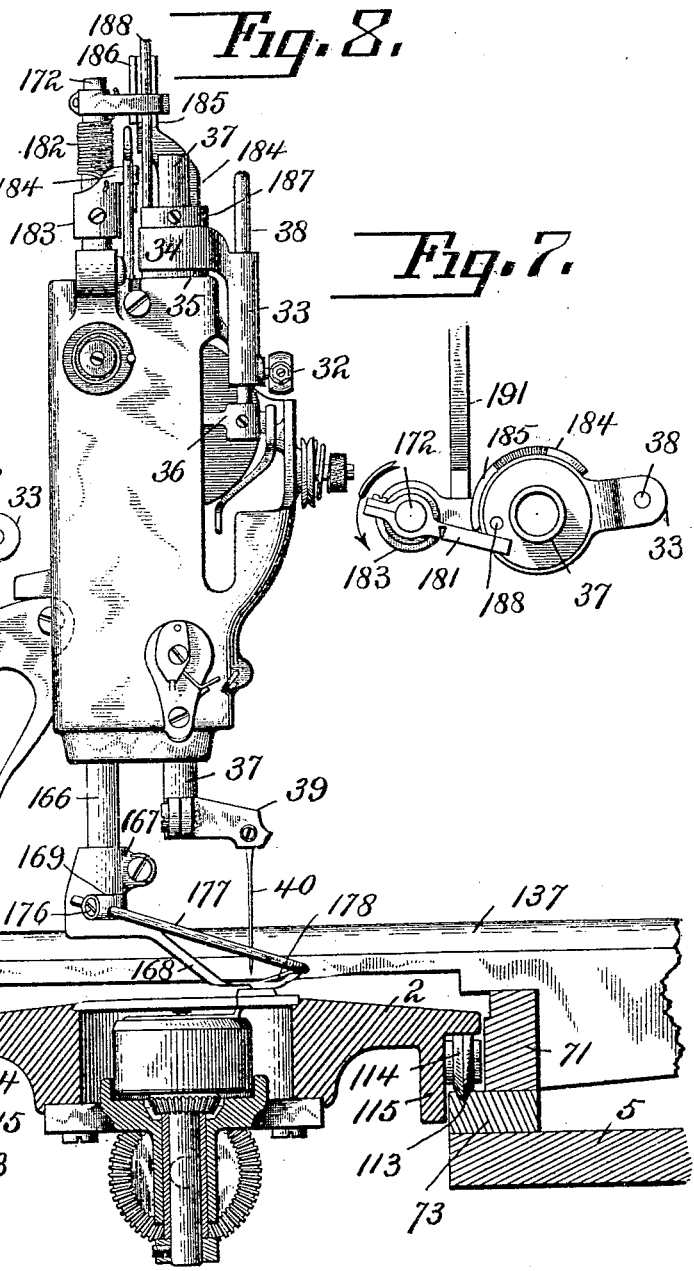
Figure 5:
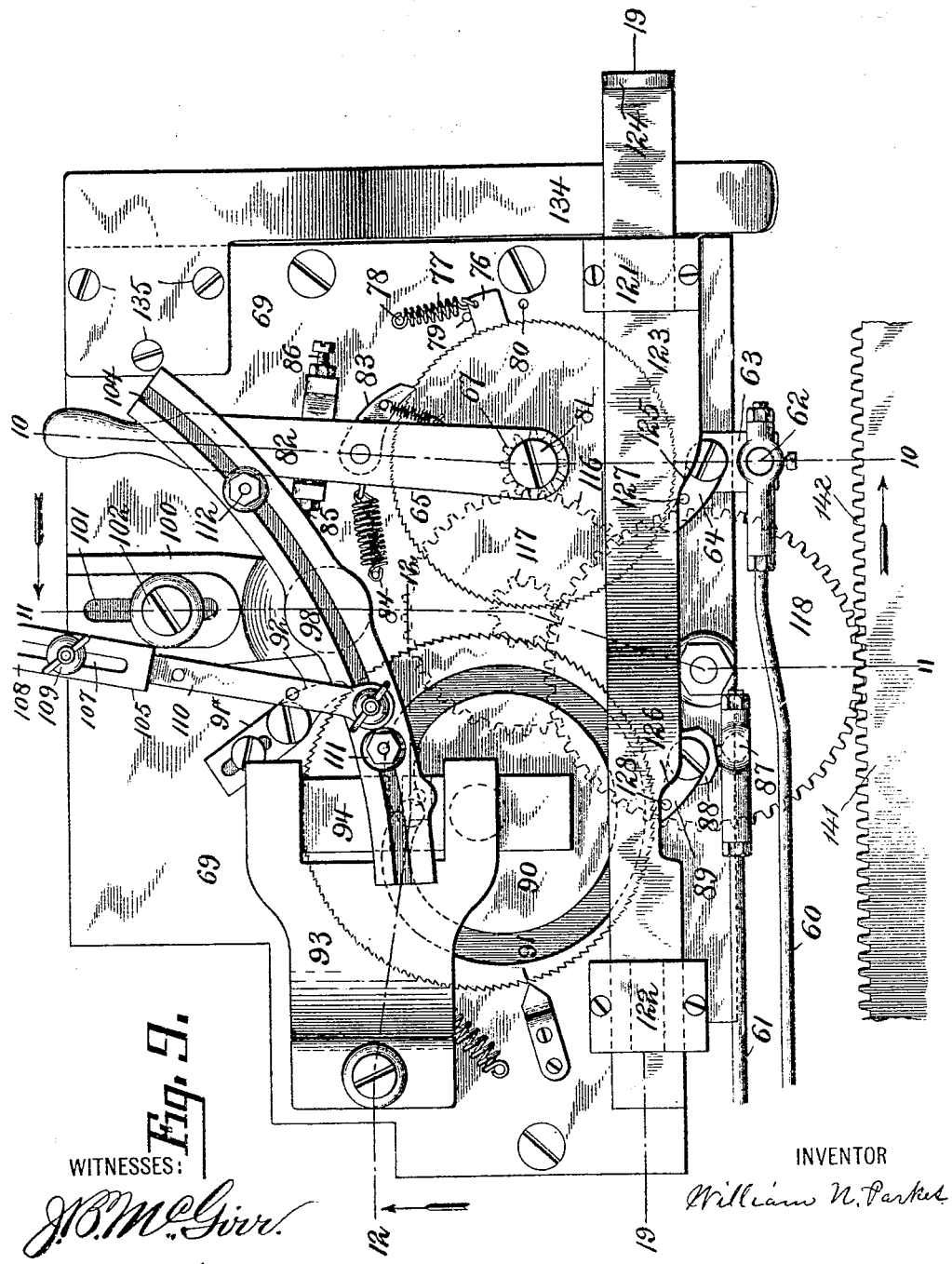
Figure 22:
Figure 24:
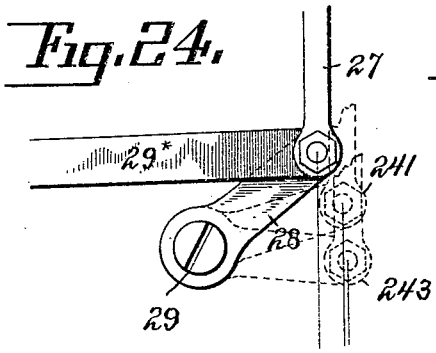
Figure 25:
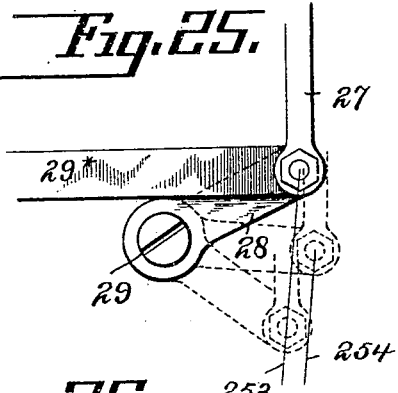
Figure 26:
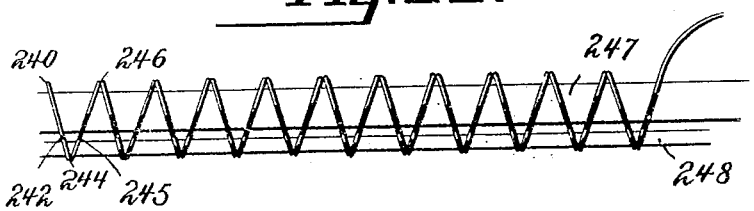
Figure 27:
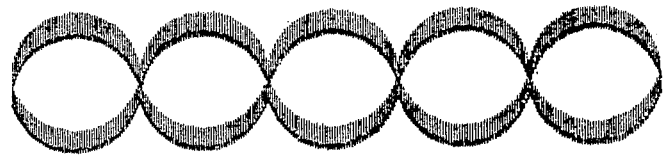

Referring now to the drawings: Figure 1 is a top plan view of the machine with its appurtenances, except the arm which is broken away to show the arrangement and location of the operating parts. Fig. 2 is a rear elevation of the machine, some parts in section, while others are omitted for clearness. Fig. 3 is a front elevation of the arm, showing the needle positioning mechanism. Fig. 4 is a top plan view of the presser foot, showing the vibrating thread carrying finger in one of its lateral positions, and Fig. 5 shows said finger in the other of its lateral positions. Figs. 6 and 7 are top plan views of details showing how the thread carrying finger is operated. Fig. 8 is a front elevation of the head of the machine, parts being in section to show location and arrangements of parts. Fig. 9 is a plan view of the mechanism which reciprocates the head of the machine, the said mechanism being shown detached from the machine. Fig. 10 is a vertical sectional view, taken on the lines 10—10 of Fig. 9 looking in the direction of the arrow, and Fig. 11 is a like section taken on the lines 11—11 of the same Fig. 9, and Fig. 12 is also a sectional view on the lines 12—12 of said Fig. 9. Fig. 13 is a plan view of a part of the carrier showing a portion of the work clamped therein; Fig. 14 is a cross sectional view on lines 14—14 of Fig. 13, and Fig. 15 is an enlarged detached section of one of the members of the work clamping device. Fig. 16 is a top plan view of a part of the power transmission mechanism, and Fig. 17 is a vertical sectional view taken on lines 17—17 of Fig. 16 looking in the direction of the arrow. Fig. 18 is an end view of a detail in connection with the driving mechanism showing the manner in which the power is transmitted to the pawl lever and connecting rods. Fig. 19 shows details of the pawl disengaging bar. Fig. 20 is a cross sectional view of the arm of the machine on lines 20—20 Fig. 3. Fig. 21 is a detail showing the manner in which the power for operating the mechanism that reciprocates the head of the machine is transmitted from the lower shaft of the machine. Fig. 22 illustrates a sample of edge or embroidery done on this machine. Fig. 23 is a detached detail showing the end clamping device. Fig. 24 is a detail illustrating an oscillating position of the needle bar positioning arm; and Fig. 25 is a like view illustrating a different oscillating position of said arm. Fig. 26 is a diagrammatic view of the stitches enlarged. Fig. 27 is a design used in illustrating a detail in the adjustments. Fig. 28 is an illustration of a plain zig zag stitch done on the machine. Fig. 29 is a rear end view of the head of the machine showing the stop motion thereon. Fig. 30 is a vertical sectional view of the tripping lever showing its coöperating part therein. Fig. 31 is a detached detail sectional view of the upper part of the bracket 13, showing the parts in position thereon. Fig. 32 is a sectional view on line 32—32 of Fig. 13. Fig. 33 is a front elevation of the cone shaped house for the threads.

In the drawings, 1 indicates the arm of the head of the machine, 2 the base to which the said arm is secured, 3 the driving shaft, 4 the lower shaft, and 5 the table which is provided for carrying the head of the machine and the work carrying mechanism. The lower shaft 4 of the machine may be driven in any suitable manner from the driving shaft, and it is to be understood that in the present form of my invention, the lower shaft revolves in unison with the upper shaft.

In the usual construction of sewing machines in which the needle is moved laterally, the said lateral movement is transmitted from a cam to the needle. In my invention, the needle is moved laterally directly from the movement of a ratchet wheel, no cam being used at all in connection with moving the needle laterally.

In my copending application, Serial No. 93,037, filed February 7, 1902, is claimed and described a reciprocating needle-bar which is adapted to oscillate in fixed bearings, means being provided for carrying the needle eccentrically with respect to the axis of the bar, so that when the bar is oscillated, the needle is moved laterally.

The needle-bar shown herein, is located and constructed as in my said copending application; it is reciprocated by the same means, and is free to be oscillated as in said application, but different means are provided for oscillating it.

The means by which the needle-bar is oscillated and the needle thereby moved laterally, will now be described.

On the upper shaft 3 of the machine, is secured a gear 6 which meshes with a like gear 7, the latter being located in suitable bearings attached to the arm of the machine, as shown in Fig. 20. A disk 8 is attached to the hub of the gear wheel 7, and this disk 8 carries a crank pin or shouldered screw 9, on which is pivoted one end of a pitman 10. The other end of said pitman is connected to an arm 11 which in turn is secured to a short transverse shaft 12. The shaft 12 is suitably mounted in a bracket 13, which latter is attached by means of screws 14 to the top of the arm of the machine. To the forward end of the shaft 12 is attached an arm 15 in which is formed a way 16 that extends over the axis of the shaft 12. In the way 16, is adjustably connected one end of a link 17, the other end of said link being connected to a pawl lever (not shown), which latter carries a pawl 18. The pawl 18 is adapted to engage the teeth 19 formed in the periphery of a ratchet wheel 20, the latter being secured to the forward end of a short shaft 21, which is suitably journaled in the bracket 13.

In the side of the ratchet wheel 20, is a way 22 which extends over the axis of the shaft 21, and in the said way, is adjustably located the lower end of a link connection 23, the upper end of which is suitably pivoted on a part 24, which is adapted to slide on a post 25, secured in the bracket 13. To the part 24, is pivoted the upper end of a part 26, the lower end of said part being adjustably connected to a part 27. An arm 28 is suitably pivoted at 29 to the arm 1 of the machine, and the lower end of the part 27 is suitably connected to the end of the arm 28. To the outer end of the arm 28 is also suitably pivoted one end of a part 29*. The free end of a rod 30 is adjustably secured in a suitable manner, by means of a clamping screw 31 to the end of the part 29*. The forward end of the rod 30 is suitably pivoted at 32, to an arm 33, which is pivoted at 34 on a bearing 35, attached to forward end of the arm of the machine. An arm 36 is suitably attached to a needle-bar, which latter is adapted to be oscillated as before noted. In the arm 36 is located an upwardly extending rod 38, the same being adapted to reciprocate in a bore formed in the arm 33. (See Fig. 8.) To the lower end of the needle-bar 37 is attached a needle holder 39 which carries a needle 40. It will now be understood, that the arm 28 is oscillated by means of the ratchet wheel 20, and that the needle-bar is oscillated by the movement of the arm 28, and the connection between the same and the needle-bar. The adjustment of these parts and their operation so as to secure the desired result, will be explained in connection with the explanation of the general working of the machine.

In my embroidery machines, Patent No. 652,326 and No. 693,666, dated June 26, 1900, and February 18, 1902, respectively, and in my copending application, Serial No. 288,208, filed November 20, 1905, to produce the desired movement between the laterally moving needle, and the work, the work is moved laterally.

In my present invention, the work is moved forward to properly locate the stitches relative to each other, and at the same time, the head of the machine is moved laterally to produce the desired movement for the design that is to be embroidered.

The means provided for moving the head of the machine laterally and the work forward in combination therewith, to produce the desired design will now be described.

To the lower shaft of the machine is attached an eccentric, see Fig. 21, which is adapted to reciprocate in a usual manner, one end of a pitman 41, the other end of said pitman being in engagement at 42 with the lower end 43 of a bell crank lever. The bell crank lever is pivoted on a bearing 44 carried by a bracket 45, which latter is attached to the base 2 of the head of the machine. The free end of the bell crank lever is provided with legs 46 and 47, which carry rollers 48 and 49. In suitable brackets 50 and 51, attached to the table 5, is journaled a shaft 52 which carries arms 53 and 54. One end of a round bar 55 is secured in the arm 53, and the other end of said bar is secured in the arm 54. The bar 55 is located between the rollers 48 and 49. The shaft 52 passes freely through a bore which extends through the bearing 44, so the said shaft does not contact with the bearing at all, and the axis of the bell crank lever is concentric with the axis of the shaft.

To the forward end of the shaft 52 is attached arms 56 and 57 in which is formed ways 58 and 59. In the way 58, is adjustably located one end of a connecting rod 60, and in the way 59 is adjustably secured one end of a connecting rod 61. The forward end of the rod 60 is operatively connected at 62 to the end of a pawl lever 63, which carries a pawl 64. The pawl 64 is in engagement with the teeth of a ratchet wheel 65, which latter is secured to the upper end of a short shaft 66, the lower end of said shaft being provided with a flange 67 on the periphery of which, gear teeth are cut as shown in Fig. 10. The shaft 66 is journaled in a bushing or bearing 68, which latter is secured to a plate 69, that is in turn secured to bearings 70 and 71. The bearings 70 and 71 are secured to rails 72 and 73, and these in turn are secured to the table 5 of the machine. (See Fig. 8.)

The plate extends across the top of the base 2 of the machine and sufficiently above the same to permit the head of the machine to reciprocate free of said plate, and the mechanism carried by the same. The toothed flange 67 abuts against the lower side of the bushing 68, and the ratchet wheel 65 rests on the top of said bushing, and thus the shaft 66 is retained in its bearing.

To the under side of the ratchet wheel, is attached a bearing 74 on which is located a friction ring 75 having an extending part 76 (Fig. 9) to which is attached one end of a spring 77, the other end of said spring being secured at 78 to the plate 69. Pins 79 serve as an abutment against which the spring 77 normally draws the part 76 of the friction ring, and pin 80 serves as a means for limiting the movement of friction ring.

On the upper end of the shaft 66, is located a shouldered screw 81 on which is pivoted a lever 82 which carries a stop pawl 83 that engages the teeth of the ratchet wheel 65. A spring 84 is at one end attached to the lever 82, and at its other end to the plate 69, as shown in Fig. 9. An adjustable screw 85 serves as a means for adjustably locating the nose of the stop pawl relative to the teeth of the ratchet wheel, and an adjustable screw 86 serves as a means for regulating the extent the lever 82 may be moved, and through it the number of teeth the stop pawl will move the ratchet forward at each stroke of the lever 82.

In the operation of the machine, the friction between the friction ring 75, and the bearing 74, causes the ratchet wheel to carry the friction ring forward against the strain of the spring 77, until the tension of the spring is sufficient to overcome the tension of the friction between the bearing and the friction ring. Under these conditions, the part 76 is not in engagement with either one of the pins 79 and 80 when the machine is running at its maximum speed, and consequently, the spring 77 holds the teeth of the ratchet wheel against the stop pawl, and if the actuating pawl throws the ratchet wheel ahead of any part of a tooth, the wheel is at once drawn back to its proper position, when the actuating pawl commences its return movement.

Mounting the stop pawl on a lever, and providing the same with adjustments as described, serves as a means for readily moving the ratchet wheel forward, and the mechanism operated by it, a measured distance.

The forward end of the connecting rod 61 is operatively connected at 87 to a pawl lever 88 which carries a pawl 89 adapted in a suitable manner to engage the teeth of a cam ratchet wheel 90 in the side of which is a cam groove 91. The wheel 90 is suitably journaled in a bearing (not shown) which is attached to the plate 69, and the pawl lever 88 is pivoted on the said bearing. On an adjustable part 91* is pivoted a stop pawl 92, which is suitably arranged to engage the teeth of the wheel 90, and thereby prevent retrograde movement of the same. A friction device (not shown), such as has been described in connection with wheel 65, is provided for controlling the wheel 90.

In a bracket 93, which is attached to the plate 69, is suitably mounted to slide, a plate 94 which carries an anti friction roller 95 that is in engagement with the cam groove 91 of the wheel 90. The slide 94 is provided with a way 96 that runs across the top of the slide, and in said way is located a shoe 97, which is carried by a pin projecting from the under side of a lever 98. The lever 98 is secured to a shaft or bearing 99 that is journaled in a bracket 100, as shown in Fig. 11. The bracket is provided with a slot 101, through which passes a bolt 102 that is located in a threaded seat formed in the plate 69. A collar 103 serves as a means for retaining the bearing 99 in the bracket 100. The lever 98 extends an equal distance on each side of its pivot, and in the face of said lever is formed a way 104, in which is adjustably secured one end of a two part connection 105, the other end of said connection being connected at 106 (Fig. 1) to the arm of the machine. A slot 107 passes through the part 108 of said two part connection, and through this slot passes a thumb screw 109, which has a seat in the part 110 of said connection. This slot and screw serves as a means for adjusting one part of this connection relative to the other, and thereby changing the position of the head of the machine relative to the work carrier. In the way 104, is adjustably located stops 111 and 112, which serve as a means for predetermining the point at which to adjust the end 110 of the two part connection in the way 104.

In the rails 72 and 73, is formed grooves 113, in which is located wheels 114 that are suitably carried by the downwardly extending flanges 115 of the base of the head of the machine. These wheels serve as a means for permitting the head of the machine to be reciprocated, and the grooves in which the wheels run, serve as a means for guiding the reciprocation of the head along a straight line or path.

The small gear 67 meshes with a large gear 116, which carries a small gear 117, the latter in turn meshes with a large gear 118. The gear 117 is journaled on a stud shaft 119, and on the same is formed a hub on which the gear 116 is rigidly secured. The stud shaft 119 is secured to the under side of the plate 69, and a screw 120 which has a seat in the end of said shaft serves as a means for retaining the gears 117 and 116 on the shaft, as shown in Fig. 11.

In the bearings 121 and 122 is adapted to slide, a part 123 on which is formed an upwardly extending end 124. On one edge of the part 123, is formed cams 125, and 126, which are adapted to engage pins 127 and 128, carried by pawls 64 and 89, respectively. To the under-side of the rear end of the part 123, is secured a pin 129, to which is secured one end of a spring 130, the other end of said spring is connected to a pin 131, located in an opening 132, formed in the bearing 122. To the under side of the forward end of the part 123, is secured a pin or catch 133, which is adapted to be engaged by a spring latch 134, that is secured by means of screws 135 to the plate 69. The normal tendency of the spring 134 is to press upwardly against the end of the pin 133.

In the operation of this device, the part 123 is moved by the operator, in the direction of the arrow shown in Fig. 19, against the action of the spring 130, until the pin 133 comes into contact with the side of the bearing 121, at which point the spring 134 moves upwardly to its position shown in full lines in Fig. 19, and this securely holds the part 123 in this position. This movement of the part 123 causes the cams 125 and 126 to engage the pins carried by the operating pawls, and thereby lift said operating pawls out of engagement with the ratchet wheels, a sufficient extent so that in the further movement of the machine, the pawls will not engage the teeth of the ratchet wheels. To bring the operating pawls again into engagement with the ratchet wheels, a downward pressure is exerted on the outer end of the spring latch 134, which permits the spring 130 to return the part 123 to its normal position indicated in dotted lines in Fig. 19. By this device, the operating pawls may be instantly thrown in or out of engagement with the teeth of the ratchet wheels, while the machine is operating.

To the table of the machine is secured a track 136, on which is formed upwardly extending flanges 137 and 138, which serve as guide ways for rollers or wheels 139 that are suitably carried by a work carrier frame 140, a part of which is shown in Fig. 13. The part of the frame 140 which is not shown, is substantially the same as the part that is shown. On the part 141 of the frame, is formed a toothed rack 142, which extends the length of the frame, and the gear 118 is in engagement with said toothed rack. Along the inner edge of the part 141, and on the top of the same, is formed a tongue 143, in which is located upwardly extending pins 144. On the upper side of the part 145, of the frame, is formed a tongue 146. A part 147 has a groove 148 formed in it, and a downwardly extending flange 149 extending along its inner edge. The groove 148 serves as a housing for the pins 144, and the edge of the walls of the groove as a means for pressing the work down on the pins, and the flange 149 serves as a means for pressing the work down to the needle plate. The part 150 has a groove formed in it, in which the tongue 146 is located when the said part is in position of holding the work. A series of tapered pins 151 serve as a means for guiding the clamping parts 147 and 150 to their proper position of clamping the work, and levers 152 and 153 are suitably constructed to press the parts 147 and 150 downwardly, and thereby securely hold the same in position. The other ends of the parts 147 and 150, not shown, are held in position by substantially the same kind of means shown in connection with the ends that are shown.

A tube 154 is secured at its ends in brackets 155, by means of screws 156*, as shown in Fig. 14. This tube 154 is for the purpose of holding the work away from the operating parts of the machine as the work carrier carries the work along, and the tube and brackets being carried by the work carrier frame, they of course, move with the work.

To the end 140 of the work carrier frame, is attached by means of a screw 156, a bar 157. Guides 158 which are also attached to the part 140, serve as means for properly retaining the bar in position and preventing the same from lateral movement. The bar is provided with holes 159, through one of which the screw 156 passes, and the screw is seated in the part 140. The series of holes 159 serve as a means for permitting the adjustment of the bar to different predetermined positions. To the end of said bar, is secured by means of screws 160 a flat spring 161. The outer end of said flat spring turns upwardly as at 162 (Fig. 23,) into a groove 163, which runs transversely across the extreme end of the part 157, and on the under side of the same. A yoke 164, is secured to the under side of the spring 160, and this yoke extends upwardly and across the top of the part 157, and to the top of the yoke is secured a button 165. This clip or clamp is for the purpose of assisting in properly holding the work in position as will be further explained in connection with the general explanation of the operation of the machine.

The means provided for guiding a filling cord under the narrow or binding stitches and the long stitches, will now be described. In making the binding stitches, the needle is moved laterally a very limited extent, and this in connection with the fact that the stitch forming mechanism is moved laterally, makes it desirable that the finger which leads the filling thread under the narrow stitches should be moved laterally in an opposite direction to the direction in which the needle moves laterally. This movement in the present form of my invention, is secured from a moving part of the stitch forming mechanism.

A presser-bar 166 is mounted in a usual manner in bearings in the forward end of the machine, and this presser-bar is depressed by a usual spring in a usual manner. To the lower end of the presser-bar is clamped the shank 167 of a presser foot 168, an opening 169 being formed between the shank and the foot. The presser foot is provided with an opening 170 for the passage of the needle, and with a tube 171 for guiding a filling cord under the embroidery or long lateral stitches. A bore is formed longitudinally through the presser-bar, and in said bore is located to oscillate a rod 172 to the lower end of which is secured, by means of a set screw 173, a holder 174 on which is formed a projecting part 175. In the part 175, is secured by means of screw 176, a finger 177, on which is formed a tapered end 178, and through said tapered end passes a bore 179 of sufficient size to permit a small cord or thread to pass through the same. The part 174 of the holder just fits the opening 169 between the shank of the presser foot and the foot, and thereby serves as a means for holding the rod longitudinally in position. To the upper end of the rod 172 is clamped, by means of a screw 180, an arm 181. One end of a spring 182 is located in the said arm 181, and the other end of said spring is located in a sleeve 183, which in turn is secured on the upper end of the presser-bar 166.

The normal tendency of the spring 182 is to turn the arm 181 in the direction indicated by the arrow in Fig. 7, and thereby to turn the finger 177 in the direction indicated by the arrow in Fig. 4.

To the side of the oscillating lever or arm 33, is secured a part 184, on which is formed an upwardly extending end 185, provided with a vertically extending face 186, which latter is adapted to engage the arm 181. On the upper end of the bearing 35, is secured a collar 187 which carries a stop pin or rod 188. This collar serves as a means for retaining the part 34 of the arm 33 in proper position on its bearing, and also as a means for adjusting laterally the stop rod 188.

In the operating of the machine, it is desirable to lift the presser foot from the work during the time the work moving mechanism is moving the work. For this purpose, the following means have been provided: On the driving shaft of the machine, is suitably secured an eccentric, not shown. One end of a connection 189 is in suitable engagement with said eccentric to be operated by the same. The upper end of the part 189 is at 190 in engagement with one end of a lever 191. The lever is pivoted at 192 to a bracket 193, which in turn is secured to the top of the arm of the machine. The forward end of the lever 191 is in engagement with a lug 194 formed on the sleeve 183. This construction serves as a means for lifting the presser foot from the work, just previous to the movement of the same, and holding it from the work against the action of the presser-bar spring until the said work is again at rest, after which the presser-bar spring is permitted to return the foot to the work. This engagement between the presser foot and the work takes place just previous to the needle entering the work.

The means for automatically stopping the machine after a predetermined length of embroidery has been made, will now be described.

To the rear end of the driving shaft of the machine is secured a wheel 194*, and next to said wheel on the end of said shaft is mounted to turn on the shaft, a wheel 195. An extension 196 and 197 is formed on the wheel 195, and in the part 196 is a groove 198 which adapts said wheel to be driven by a belt in a usual manner. The inner side of the wheel 195 is provided with a suitable friction material (not shown,) which adapts it to revolve the wheel 194 when pressed into engagement with the same. On a stud shaft 199 is pivoted a compound lever 200 which is provided with an upwardly extending part 201, on the end of which is formed a head 202. The head 202 is normally in engagement with a button or projection 203 carried by the part 197, and presses on the same a sufficient extent to cause the wheel 195 when it is revolved to revolve the wheel 194, and thereby operate the machine. To an end 204 which extends downwardly from the lever 200, is pivoted one end of a catch 205, in which is formed a notch 206, and in the said notch is located a thickened end 207 of a spring latch 208. The normal tendency of the spring part 208 of the latch is to press the end 207 into the notch 206. On the lever 200, is formed an arm 208*, which carries a friction material 209, which is adapted to engage the periphery of the wheel 194. A bracket 210 is secured to the base of the head of the machine, and in said bracket is located a threaded bolt 211. This bolt passes freely through the bracket and lock nuts 212 and 213 serve as means for adjustably securing the same in position. To the end of the bolt is secured one end of a spring 214, and the other end of said spring is secured to the end 204 of the lever 200. The normal tendency of the spring is to draw the lower end 204 of the lever 200 towards the bracket 210, and the friction surface 209 into engagement with the periphery of the wheel 194. The latch 207 normally holds the lever 200 against the action of the spring 214 so the part 209 is out of engagement with the wheel 194. The means by which this stop motion is tripped into action, will now be described.

On the rear side of the arm of the machine is pivoted at 215, a lever 216, the lower end 217 of which turns in under the spring latch 208, as shown in dotted lines in Fig. 29. Near the top end of the lever 216 is an enlarged portion as at 218, and the weight of this part is sufficient to trip the stop motion into action, when the lever is moved so that it falls into the position shown in dotted lines in Fig. 2. A lever 219 is pivoted at 220 to a post 221, which is carried by the head of the machine. To the forward end of the lever 221, is adjustably secured by means of a thumb screw 222, a part 223, on the end of which is an incline 224. The rear end of said lever is inclined as at 225, Fig. 1. On the clamping part 147 is adjustably secured a tripping dog 226, which has an upwardly extending part 227. (Fig. 13). A pin 228 located in the rear side of the arm of the machine, serves as a stop for the drop lever 216. On the upper end of the lever 216 is a reduced portion 229, in which is located a needle 230. These parts serve as means for tripping the stop motion into action from the movement of the work carrier, or from the movement of a knot or thick place in the thread, as will be more fully set forth in connection with the general explanation of the operation of the machine which will be presently made.

A stop pawl 231 is pivoted on the bracket 13, and this pawl is adapted to engage the teeth of the ratchet wheel 20. On the rear end of the shaft 21 is located a friction device 232 to the end of which is attached one end of a spring 233. Pins 234 and 235 serve as means for limiting the movement of the friction device. This device clamps the shaft 21, and produces a friction on the same, and the spring 233 draws on the device in the opposite direction to the rotation of the shaft, and thereby draws the ratchet wheel against the stop pawl 231, and prevents the ratchet wheel from throwing ahead.

A cone shaped house 236 having a delivery eye 237 at its top, is provided for the thread, and the mass of the same is suitably located in the said house, and the latter is suitably connected to the table of the machine. The cone shaped houses 238 and 239 are the same as the one above described for the thread, and in each of the cones, means are provided for housing in a suitable manner the filling cords, and delivering the same from the top as the thread is delivered. These threads and cords may be guided from the tops of the cones to the needle, and to the tubes which guide the filling cords under stitches in any usual manner.

In the operation of the machine to make an embroidery scallop or festoon, as shown in Fig. 22, the following adjustments are made. The end of the link 17 is adjusted out on the vibrating arm 15 a sufficient extent to cause the pawl 18 to engage the teeth of the ratchet wheel 20, and as there are only four teeth in said wheel, the extent of the stroke of the said pawl will be substantially one quarter of the circumference of the wheel. The teeth in the ratchet wheel, the position of the movement of the actuating pawl, the position of the stop pawl, and the location of the way 22, are such relative to each other, that the way at one stroke of the actuating pawl is moved so that it runs in a horizontal plane, and at the next stroke so it is in a vertical plane. It will thus be understood, that the ratchet wheel 20 is operated so that the way 22 runs alternately in a horizontal plane and a vertical plane at the finishing of the strokes of the actuating pawl 18. The movements of these parts are so timed relative to the movement of the needle that the ratchet wheel is at rest during the time the needle is in engagement with the work, and therefore no lateral movement of the needle takes place during this time.

To give the needle the lateral movements for producing the lateral stitches indicated in the design referred to, (Fig. 22), the end of the part 23 is adjusted away from the axis of the ratchet wheel 20 so as to move the arm 28 about its axis a sufficient extent, and the parts 26 and 27 are adjusted relative to each other so the arm 28 will be moved as indicated in Fig. 24. Referring now to said Fig. 24, the arm 28 is shown in full line in the position it is in when the way 22 in the ratchet wheel 20, is in a vertical line above the axis of the wheel. In Fig. 26 is shown a diagrammatic view of the stitches made in said scallop, and when the arm 28 is in the position shown in full lines in Fig. 24, the needle passes through the fabric at the point indicated by 240 in said Fig. 26. The next stroke of the actuating pawl moves the arm 28 to the position in dotted lines in said Fig. 24, which position is indicated by reference character 241, and this movement of said arm changes the needle laterally to the position indicated by 242 in Fig. 26. It is now seen a long lateral stitch has been made. The next stroke of the actuating pawl 18 brings said arm to the lowest position, shown in dotted lines in said Fig. 24, and this position is indicated by the reference character 243. This movement of said arm brings the needle to the position indicated by 244 in Fig. 26, and it is thus seen a narrow edge stitch has been made. The next stroke of the actuating pawl brings the said arm back to the position indicated by 241 in Fig. 24, and this brings the needle to the position indicated by 245 in Fig. 26, and it is thus seen a second narrow depth stitch has been made. The next stroke of the actuating pawl brings the said arm back to the position shown in full line in said figure, and this movement brings the needle to the position indicated by 246 in Fig. 26, and thus it is seen the short and long lateral stitches of which the scallop shown in Fig. 22 is composed, are made.

The reference character 247 in Fig. 26, indicates the filling material that is placed under the long lateral stitches, and the reference character 248, indicates the filling thread that runs under the narrow binding stitches.

The operation of the means which moves the head and the work carrier so as to place the stitches in a proper position on the fabric to produce the embroidered scallop shown in said Fig. 22, will now be explained.

Assuming now that it is desired to make a scallop one inch in length, the extent of the stroke of the actuating pawl 64, and the extent of the stroke of the actuating pawl 89 is so adjusted that the cam ratchet 90 revolves once while the ratchet 65 moves the work carrier forward one inch. The compound gearing between the ratchet wheel 65, and the work carrier rack is for the purpose of producing a slow movement of the work carrier, so the embroidery stitches will be close enough together to completely cover the part of the fabric that is being embroidered. It will be understood that a gear operated by the ratchet wheel 65, might be in direct engagement with the work carrier rack, but to transmit the slow movement to the rack required, the teeth of the ratchet wheel would have to be very fine, or the diameter of the wheel would have to be very large, so in practice, I prefer using this compound movement. Assuming now that the cam ratchet revolves once to one inch of movement of the work carrier, the end of the part 110 is adjusted out from the axis of the pivot of the lever 98, a sufficient distance to produce the depth of scallop desired. The cam groove in the ratchet 90 is constructed to give the desired movement for producing the scallop shown in Fig. 22. The design of the scallop may of course, be changed by using different shaped cams or it may be changed by changing the speed of the cam ratchet 90. In commencing the scallop 22, shown in Fig. 22, the cam ratchet 90 is in the position shown in Fig. 9, and the needle is at the point indicated by reference character 249 in the Fig. 22, and the end of the part 110 is in the way 104 on the side of the axis of the lever 98 as shown in said Fig. 9.

Pieces of fabric are usually made a certain width, or at least they are supposed to be. Also towels and the like, are made a certain width. For example, 27 inches is a usual width for towels. In actual practice, it very often happens that towels that are supposed to be 27 inches wide, are only 26½ or 26¾, so if the machine is set to make scallops across a towel 27 inches wide, the scallops will not match up at the finishing of the scallop at the finishing side of the towel. If the towel is only 26½ inches wide, the embroidery will finish with a half of a scallop, and this looks very defective on a towel. To overcome this difficulty, I provide means for permitting the work to be stretched to the desired width, and then held in this stretched position during the embroidery of the article. Assuming now that it is desired to make 27 scallops, one inch in length, across a towel that is only 26¾ inches in width. The pins 144 in the work carrier are a measured distance apart. One edge of the towel is impaled on the proper pin, which is a little higher than the others, at one end of the carrier, and then the towel is stretched so that it is impaled on the proper pin, which is also a little higher than the others, at the other end of the carrier, so the towel at this point, is full 27 inches wide, then the clamping part 147 is pressed down, and this impales the entire edge of the end of the towel on the pins. Then one edge of the towel is clamped by the means at the end of the bar 157, and the towel is stretched, and clamped by like means at its other edge, and thus it is seen that means are provided for properly stretching the fabric so that it will be the proper width across the part that is embroidered. Assuming now that the towel is secured in the clamping devices mentioned, the part 150 is now placed in position, and it is seen that by these means, the towel or piece of fabric may be held taut lengthwise, as well as crosswise.

It will be remembered that the parts are adjusted so the needle is at the point indicated by the reference character 249, in Fig. 22, which we will assume is the beginning of a scallop at the edge of a piece of fabric. Before beginning the scallop, the cam bar 123 is moved by the operator, in the direction of the arrow, (Fig. 19) until the pin 133 passes off at the spring 134, when the latter engages the pin, and holds the cam bar in the position of disengaging the actuating pawls 64 and 89 from the ratchet wheels, which they operate, while said bar is in this position, the mechanism that reciprocates the head and moves the work carrier, will be at rest, and consequently, the head and carrier will be at rest. The machine is now started, and a few tacking or binding stitches are made on top of each other, as indicated at 249, Fig. 22. After the desired number of binding stitches have been made, the operator presses downwardly on the end of the flat spring 134, and this releases the bar 123, when the spring 130 rapidly returns the same to its normal position, and the pawls come into engagement with the ratchet wheel. It is of course, understood that the operator manipulates the device to throw the actuating pawls into engagement with the teeth of the ratchet without stopping the machine.

Assuming now that the point indicated by reference character 250 in Fig. 22, is the finishing of the scallops arcoss the end of a towel, the end 227 of the stop dog comes into engagement with the end 224 of the lever 219, and moves it to trip the drop lever 216 into action, and the machine is thereby stopped. A spring 251 normally holds the lever 219 into engagement with a pin 252.

It is to be noted that the head of the machine is moving in the direction of the arrow (Fig. 1) at the finishing of a scallop, and that the major position of the movement for actuating the lever 219, and thereby tripping the stop motion into action is derived from this movement of the head, as the movement of the head at this point is much faster than the movement of the work carrier.

If it is desired to make the design shown in Fig. 27, the end of the connection 110 is adjusted to the other side of the pivot of the lever 98, against the adjustable stop 112. The adjustable bracket 100 is shown in the position for making this figure in Fig. 9.

If a plain zig zag stitch is desired, such for example, as is shown in Fig. 28, the part 27 is adjusted so the arm 28 is moved an equal distance each side of a line drawn through the axis of the pivots 32 and 29, (Fig. 3.) Under this adjustment, the arm 28 will be moved about its pivot 29, as indicated in Fig. 25, and the needle will be moved laterally an extent indicated by the lines 253 and 254, in said figure. It is thus seen that the ordinary zig zag movement may be transmitted to the needle by the use of this device. A switch cam, it will be remembered is used in zig zag machines for transmitting this movement to the needle.

Under the control of my friction device, described and broadly claimed in my co-pending application, Serial No. 288,208, field November 20, 1905, this mechanism for moving the needle laterally, may be run at a very high rate of speed, and as the ratchet wheel is always drawn back or held against the stop pawl, the needle is properly placed laterally.

In the foregoing I have described a preferred form of my invention, but it is to be understood that I do not wish to be limited to this particular form, as changes may be made in the same without departing from the spirit of my invention.

Having now described a preferred form of my invention what I claim as new is:

1. In a sewing machine, a work moving mechanism comprising means for moving the work progressively forward, a stitch forming mechanism comprising a reciprocating and laterally moving needle, and means for automatically moving the complete stitch forming mechanism laterally relative to the work.

2. In a sewing machine, a stitch forming mechanism comprising a reciprocating and laterally moving needle, a work moving mechanism comprising a work carrier, means adapted to change laterally the working position of the complete stitch forming mechanism relative to the work carrier.

3. In a sewing machine, a stitch forming mechanism comprising a reciprocating and laterally moving needle, a work moving mechanism adapted to move the work at substantially right angles to the direction in which the needle moves laterally, and means for reciprocating all of said stitch forming mechanism.

4. A sewing machine comprising a vertically reciprocating and laterally vibrating needle, a work moving mechanism, and means adapting said work moving mechanism to change laterally the working position of said laterally vibrating needle.

5. In a sewing machine, a stitch forming mechanism comprising a reciprocating needle adapted to be moved laterally, means for moving said needle a plurality of steps laterally, means for moving the work in a direction substantially at right angles to the lateral movement of said needle, and means for moving the stitch forming mechanism laterally in substantially the same direction in which the needle moves laterally.

6. In a sewing machine, a stitch forming mechanism comprising a reciprocating needle adapted to be moved laterally, means for moving said needle laterally so as to make a short stitch and then a long stitch, means for reciprocating said stitch forming mechanism, and means for moving the work in a direction at substantially right angles to the direction in which the stitch forming mechanism is reciprocated.

7. In a sewing machine, a stitch forming mechanism comprising a needle that is adapted to be moved laterally, means for moving said needle laterally so as to make a short stitch and then a long stitch, means for guiding a filling cord under the short stitches, and means for changing the working position of the stitch forming mechanism in the same direction in which the needle moves laterally.

8. In a sewing machine, a stitch forming mechanism comprising a needle which is moved laterally so as to make a short stitch and then a long stitch, means for guiding a filling cord under the short stitches, means for guiding a filling cord under the long stitches, and a work moving mechanism adapted to move the work at right angles to the direction in which the needle moves laterally.

9. In a sewing machine, a stitch forming mechanism comprising a reciprocating needle adapted to be moved laterally, means for moving said needle laterally so as to make a short stitch, means for moving said needle laterally so as to make a long stitch, a vibrating thread carrying finger for guiding a filling thread under the short stitches, a presser foot, means carried by said presser foot for guiding a filling cord or material under the long stitches, and a work moving mechanism adapted to coöperate with said stitch forming mechanism.

10. In a sewing machine, a stitch forming mechanism comprising a reciprocating and laterally moving needle, a finger adapted to guide a filling material under the stitches, means whereby said finger is moved laterally in one direction from the movement of the means that move the needle laterally, a spring adapted to move said finger in an opposite direction to said first movement, and a work moving mechanism adapted to coöperate with said stitch forming mechanism.

11. In a sewing machine, a stitch forming mechanism comprising a vertically reciprocating and laterally moving needle, a presser-bar, a rod located in a bore that passes longitudinally through said presser-bar, means for guiding a filling cord or the like under stitches carried by said rod, means for oscillating the rod, and a work moving mechanism adapted to coöperate with said stitch forming mechanism.

12. In combination in a sewing machine, a reciprocating needle adapted to be moved laterally, an intermittent revolving part, and means intermediate said part and the needle whereby the revolving movement of the part is converted into a short and long lateral movement of the needle.

13. A sewing machine comprising a reciprocating needle adapted to be moved laterally, a ratchet wheel and means for operating it, and means intermediate said ratchet wheel and said needle whereby the rotary movement of the ratchet wheel is converted into a variable lateral movement of said needle.

14. In combination in a sewing machine, a reciprocating needle adapted to be moved laterally, a ratchet wheel and means for operating it, a pivoted arm, means for converting the rotary movement of said ratchet wheel into a variable oscillating movement of said arm, and a connection between said arm and the aforesaid needle.

15. In a sewing machine, a stitch forming mechanism, a reciprocating needle adapted to be moved laterally, an operating ratchet wheel a part adapted to slide on a bearing, a connection between said wheel and said part, a connection between said part and a pivoted arm, a connection between said pivoted arm and the needle, and a work moving mechanism adapted to coöperate with said stitch forming mechanism.

16. In a sewing machine, a stitch forming mechanism comprising a revolving hook, a vertically reciprocating needle, means for moving said needle laterally relative to the hook, means for changing the working position of said stitch forming mechanism laterally comprising a cam, an operating ratchet wheel adapted to operate said cam, and a work moving mechanism adapted to coöperate with said stitch forming mechanism.

17. In a sewing machine, a stitch forming mechanism comprising a vertically reciprocating and laterally vibrating needle, an operating ratchet wheel, a cam formed in the said ratchet wheel, means in operative connection with said cam whereby the working position of the stitch forming mechanism is moved laterally, and a work moving mechanism adapted to move the work at right angles to the direction in which the said needle moves laterally.

18. A sewing machine comprising a head adapted to reciprocate on a bearing, an operating stitch forming mechanism carried by said head, means for reciprocating the head comprising an operating ratchet wheel, a cam operated by said ratchet wheel, a segmental lever operated by said cam, a way formed in the face of said segmental lever that extends each side of the fulcrum of the lever, a connection between said way and the head, whereby the head is reciprocated, and means for moving the work at right angles to the direction in which the head reciprocates.

19. A sewing machine comprising a table, a head adapted to reciprocate on said table, a stitch forming mechanism carried by said head, means for reciprocating said head comprising a ratchet wheel mounted on a bearing separate from the movements of the head, means whereby said ratchet wheel is operated from a moving part of the stitch forming mechanism and a work moving mechanism adapted to coöperate with said stitch forming mechanism.

20. A sewing machine comprising a table, a head comprising a base adapted to reciprocate on said table, a stitch forming mechanism comprising a reciprocating and laterally moving needle carried by said head, a plate or bearing attached to the table that extends over said base, an operating ratchet wheel mounted on said bearing, means adapting the ratchet wheel to reciprocate the head, and means for moving the work in a direction at right angles to the direction in which the head reciprocates.

21. A sewing machine comprising a table, a head adapted to reciprocate on said table, a stitch forming mechanism comprising a reciprocating and laterally moving needle carried by said head, an operating work moving mechanism mounted on the table, and means for reciprocating the head relative to the work moving mechanism.

22. A sewing machine comprising a table, a head adapted to reciprocate on said table, a stitch forming mechanism comprising a reciprocating and laterally moving needle carried by said head, an operating work moving mechanism mounted on said table, and means for reciprocating the head in a direction at right angles to the direction in which the work moving mechanism moves the work.

23. A sewing machine comprising a table or bearing, a head adapted to reciprocate on said table, a stitch forming mechanism comprising a laterally moving needle carried by said head, a work moving mechanism, two separately operating ratchet wheels, means adapting one of said ratchet wheels to reciprocate the head, and means adapting the other of said ratchet wheels to operate the work moving mechanism.

24. A sewing machine comprising a head adapted to reciprocate, an operating stitch forming mechanism carried by said head, means for reciprocating the head comprising a ratchet wheel, an operating pawl in engagement with said ratchet wheel, a work moving mechanism, and means for disengaging the operating pawl from the ratchet wheel.

25. A sewing machine comprising a head adapted to reciprocate, means for reciprocating said head comprising a toothed wheel, an operating pawl in engagement with the teeth of said wheel, a work moving mechanism comprising a toothed wheel, an operating pawl in engagement with the teeth of said wheel, and a device adapted by a single movement to disengage said pawls from the teeth of said wheels.

26. A sewing machine comprising a vertically reciprocating and laterally moving needle, a work moving mechanism comprising a toothed wheel, an operating pawl in engagement with the teeth of said wheel, a part adapted to slide against the action of a spring, means adapting said part to disengage said pawl from the teeth of said wheels, and a spring catch adapted to hold said part into the position of disengaging the pawl from the teeth of the wheel.

27. A sewing machine comprising a head adapted to reciprocate, a stitch forming mechanism comprising a reciprocating and laterally moving needle carried by said head, a work carrier comprising a toothed rack, means for moving said work carrier in a straight line comprising an operating gear wheel which is in engagement with said rack, and means for reciprocating the head in a direction at right angles to the direction in which the rack moves.

28. In a sewing machine, a stitch forming mechanism comprising a reciprocating and laterally moving needle, a work carrier comprising a toothed rack, a series of pins carried by said toothed rack, a clamping device adapted to press and retain the work on said pins, a second clamping device comprising a part in which a groove is formed, means for clamping the work in said grooves and thereby holding it extended across the path of the needle, and an operating gear wheel in engagement with said toothed rack.

29. A sewing machine comprising a table, a track secured to the table, a work carrier adapted to run on said track, a head adapted to reciprocate on the table at right angles to the direction in which the track runs, a stitch forming mechanism carried by said head, and means adapting the stitch forming mechanism to operate the work carrier.

30. A sewing machine comprising a reciprocating head which carries a stitch forming mechanism, a stop motion, a device adapted to trip the stop motion into action, said device adapted to be operated by the movement of a knot or thick place in the thread, an operating work moving mechanism, and means adapting a part of the work moving mechanism to cause said device to act and trip the stop motion into action.

31. In a sewing machine, a reciprocating head, a stitch forming mechanism and a stop motion carried by said head, a work moving mechanism, a part carried by said work moving mechanism, and means adapting said part to trip the stop motion into action.

32. A sewing machine comprising a reciprocating head, a stitch forming mechanism carried by said head, a work moving mechanism comprising a work carrier that moves in a direction at right angles to the direction in which the head reciprocates, a stop motion device, means adapted to trip said stop motion device into action comprising a drop lever, a pivoted lever, and means adapting the work carrier to operate said pivoted lever and thereby turn said drop lever into action.

33. A sewing machine comprising a stitch forming mechanism, a work moving mechanism, a part carried by the work carrier a stop motion, a drop lever adapted to trip said stop motion into action, a lever pivoted to turn in a plane at right angles to the plane in which the drop lever turns, one end of said lever adapted to actuate said drop lever, and the other end of said lever adapted to be engaged by the part carried by the work carrier.

34. A sewing machine comprising a reciprocating head, a stop motion carried by said head, a lever carried by said head, an inclined surface formed on one end of said lever, a work carrier that moves in a direction at right angles to the direction in which the said head reciprocates, means adapting said work carrier to engage the inclined surface of said lever, and means adapting the other end of said lever to trip the stop motion into action.

35. A sewing machine comprising a reciprocating head, a work moving mechanism adapted to carry the work in a direction at right angles to the direction in which said head reciprocates, a stop motion carried by the head, a lever adapted to trip the stop motion into action carried by the head, means adapting the work carrier to operate said lever, and a spring adapted to return the lever to its initial position after it has acted.

In testimony whereof I have hereunto signed my name in the presence of two subscribing witnesses.

WILLIAM N. PARKES.

Witnesses:
J. B. McGIRR,
W. W. KETCHUM.